United States Patent [19]
Greer

[11] 3,820,490
[45] June 28, 1974

[54] WATERCRAFT

[76] Inventor: Richard R. Greer, 6125 E. Indian School Rd., Scottsdale, Ariz. 85251

[22] Filed: Apr. 24, 1972

[21] Appl. No.: 246,776

Related U.S. Application Data
[63] Continuation-in-part of Ser. No. 231,194, March 2, 1972, Pat. No. 3,768,429.

[52] U.S. Cl. .......................... 114/66.5 H, 114/43.5
[51] Int. Cl. ................................................ B63b 35/44
[58] Field of Search ..... 114/66.5 R, 66.5 H, 66.5 P, 114/67 A, 67 R, 56, 43.5, 61; 180/116, 117, 119

[56] References Cited
UNITED STATES PATENTS

| | | | |
|---|---|---|---|
| 1,875,190 | 8/1932 | Collins | 114/66.5 R |
| 3,117,545 | 1/1964 | Warner | 180/116 X |
| 3,141,436 | 7/1964 | Cathers et al. | 114/66.5 H |
| 3,179,077 | 4/1965 | Loo | 114/66.5 H |
| 3,205,847 | 9/1965 | Smith | 114/67 A |
| 3,221,831 | 12/1965 | Weiland | 180/117 |
| 3,368,511 | 2/1968 | Frost | 114/66.5 H |
| 3,516,376 | 6/1970 | Kowalski | 114/67 R |
| 3,601,079 | 8/1971 | Giles et al. | 114/67 R |
| 3,661,111 | 5/1972 | Lippisch | 114/67 A |

FOREIGN PATENTS OR APPLICATIONS

| | | | |
|---|---|---|---|
| 560,403 | 4/1944 | Great Britain | 114/66.5 H |
| 929,853 | 6/1963 | Great Britain | 114/66.5 H |

Primary Examiner—Trygve M. Blix
Assistant Examiner—Barry L. Kelmachter
Attorney, Agent, or Firm—Cahill, Sutton & Thomas

[57] ABSTRACT

A watercraft for transporting cargo is disclosed. The watercraft is supported by lift generated by: a planar surface set at a given angle of attack with respect to the air stream, air foil surfaces, hydrofoils and to some extent by the displacement of water. A control system for maneuvering the watercraft controls the angular orientation of the hydrofoils with respect to horizontal. The hydrofoils, in combination with the forward motion of the watercraft, orient the watercraft with respect to its displacement within the water and the angular relationship of the watercraft with respect to the surface of the water. The angular orientation has the effect of altering the angle of attack of the planar surface and the air foils and thereby modifies their effectiveness as lift generating members. The watercraft employs a docking system extending from the sides thereof, which docking system cooperates with a pair of land based guide rails. On docking, the watercraft is "flown" onto these guide rails and then slowed down. As the watercraft slows down, the guide rails begin to support its weight. Similarly, when the watercraft departs from the dock and begins to accelerate, the hydrofoils and lift generating members begin to support the watercraft with less and less dependence on the guide rails for support.

3 Claims, 14 Drawing Figures

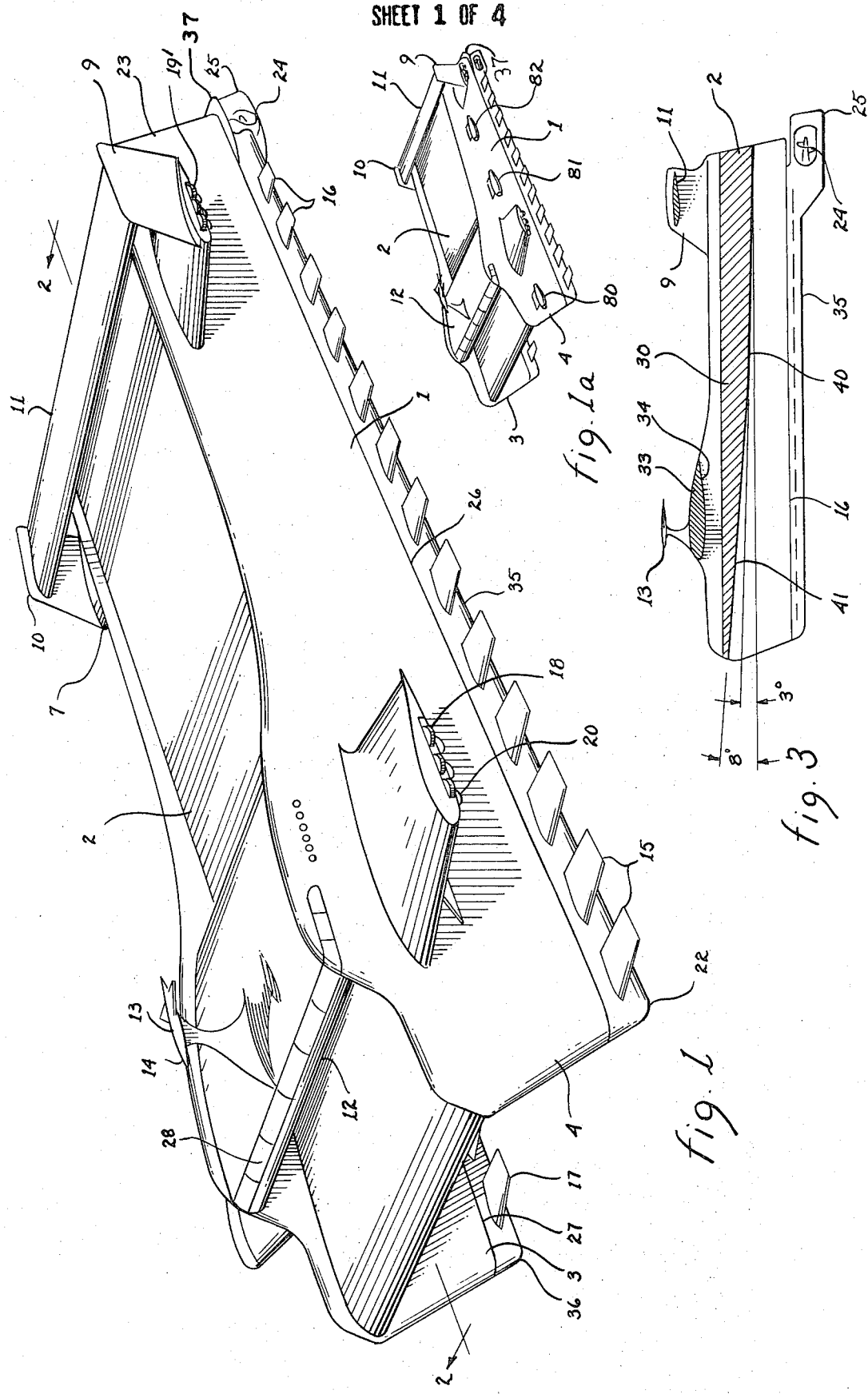

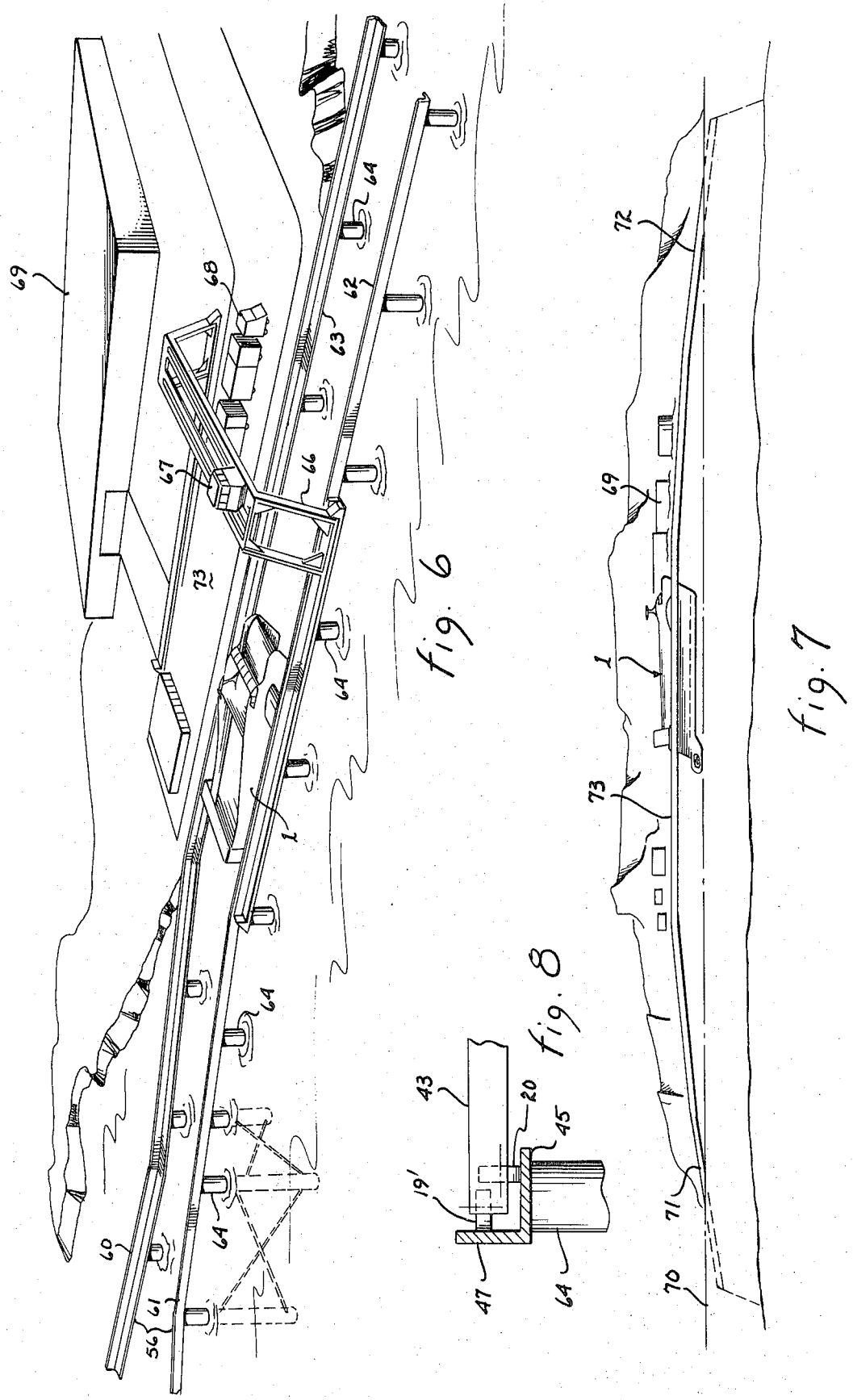

WATERCRAFT

The present patent application is a continuation-in-part of a co-pending patent application entitled "Watercraft", Ser. No. 231,194, Now U.S. Pat. No. 3,768,429, filed by the present inventor on March 2, 1972.

The present invention relates to watercraft and, more particularly, to watercraft having hydrofoils protruding along each side of the watercraft.

It has long been recognized that the speed of watercraft is a function of whether they are displacement vessels, hydrofoil vessels, planning vessels, or air-supported vessels.

The displacement vessels establish a wave at the bow of the vessel with the crest of the wave being at the bow. At slow speeds, the second crest is generally at some point rearward of the bow but in front of the stern. As the speed of the vessel increases, the second crest of the wave moves rearwardly until it is at the stern of the vessel. At this particular speed, the vessel is supported only by the displacement of the bow in the first crest of the wave and the displacement of the stern in the second crest of the wave. Should the vessel attempt to travel faster, the support provided at the stern will disappear and the vessel will sink. Thus, the maximum speed for a displacement vessel is that speed equivalent to the velocity of a wave having a period equivalent to the length of the vessel. For extremely long tanker type vessels, the speed limitation due to the shifting crests of a wave is generally not the controlling factor limiting the speed. Instead, the speed limitation is primarily dependent upon the amount of frictional resistance generated by the vessel passing through the water.

The planing vessels do not suffer from the same speed limitations as the displacement vessels. However, other limitations are present. The planing vessels are basically displacement vessels at low speed. Their hulls, however, are designed such that they interact with the water to lift the vessel to the surface of the water at high speed. There are several disadvantages associated with the planing vessel. First, the hull configuration is not designed to pass through the water in the nature of a displacement vessel with minimum disturbance of the water, and thus requires a great amount of power to bring the vessel to the minimum planing speed. Second, the planing vessel in planing position has a strong tendency to capsize due to normal wave action at the water surface. Thus, planing vessels are primarily limited to sporting or racing watercraft rather than acting as utilitarian cargo carriers.

The hydrofoil vessel is basically a combination of the displacement vessel and the planing vessel. At rest and at low speed, the hull of the hydrofoil vessel acts as a displacement hull and may be configured to offer minimum resistance to the water through which it passes. One or more hydrofoils are attached to each of a plurality of struts extending downwardly from the hull. At high speed, the water interacting with the hydrofoil creates a force tending to raise the hull out of the water. When this force is great enough, the hydrofoils will in fact lift the hull of the vessel clear of the water and thereafter continue to support the vessel. The hydrofoil vessel is less subject to capsizing due to wave action than planing vessels because the hydrofoils are situated below the surface of the water at high speed, but there are other disadvantages. A primary disadvantage of the hydrofoil vessel is that of the large forces imposed upon the struts due to the drag of the water and the lifting effect of the hydrofoil. These factors impose structural limitations upon the length of the strut and the distance between adjacent struts. For these reasons, hydrofoils are generally limited to vessels designed to operate along the coastline or within inland lakes.

The air-supported vessels are primary designed to take advantage of the reduced resistance in traveling through the atmosphere compared to that of traveling through water. However, a vessel which is transformed from a displacement vessel to an air-supported vessel at a specified speed suffers from several disadvantages. First, such a vessel is primarily dependent upon a smooth air stream adjacent the water surface, and a smooth air stream is almost never realized if there is any appreciable wind. The control systems for these vessels interact with the air stream, not the water, to stabilize the vessel. However, some maneuvers may be required which would inherently cause a section of the airborne portion of the vessel to contact the water surface. If such contact is made, the increased resistance of the water may produce disastrous results. Second, the majority of the air-supported vessels generate air lift through employment of airfoil surfaces exterior to the hull and interacting with the air stream. The amount of lift generated by these surfaces is a function of the speed of the airfoil through the air stream. Thus, if the vessel were to travel upwind, a given speed, with respect to the water surface, might produce sufficient lift. However, where the vessel travels downwind, a substantial increase in speed, with respect to the water surface, would be required to generate the same lift. For these reasons, the requirements placed upon the power plant, the latter being the only portion of the vessel engaging the water, are extreme. A third disadvantage of the airborne vessel is that of the space requirements for an airfoil of sufficient area to provide the required support. This disadvantage is particularly acute for cargo carrying vessels where the docking space is at a premium.

It is therefore a primary object of the present invention to provide a watercraft having a plurality of lift generating hydrofoil surfaces.

Another object of the present invention is to provide a plurality of lift generating surfaces.

Yet another object of the present invention is to provide angular control of the longitudinal axis of a watercraft in the vertical plane from members disposed below the water line.

A further object of the present invention is to provide stability for a watercraft by having a portion of the hull extend below the surface of the water.

A still further object of the present invention is to provide a watercraft adaptable to a plurality of propulsion systems.

Yet another object of the present invention is to provide a docking system which permits the watercraft to effect a transition from operating speed to docking speed without acting as a displacement vessel.

These and other objects of the present invention will become apparent to those skilled in the art as the description thereof proceeds.

An air-supported watercraft is disclosed which incorporates the speed advantages of a hydrofoil vessel and yet retains the inherent stability of a displacement vessel. The watercraft is primarily supported by the lift generated by a plurality of hydrofoils as it passes through the water. A side depends from each of the longitudinal edges of the hull of the watercraft and extends below the surface of the water. A plurality of hydrofoils extend outwardly below the water line from each side for the full length of each side. These hydrofoils are rotatable and generate lift as the watercraft passes through the water. The hydrofoils also act as control members for controlling the longitudinal angular relationship between the hull of the watercraft and the air stream. Additional lift generating surfaces include the hull itself and air foil surfaces extending across the bow and stern of the watercraft.

High speed screws extend from the stern of the sides to provide a propulsion force for the vessel. Rudders attached to the stern of the sides and disposed below the water line provide lateral control.

A plurality of horizontally and vertically oriented wheels are disposed at the extremities of these airfoils. These wheels cooperate with guide rails at the docking facility to support the watercraft. In operation, the vessel is initially supported by the guide rails at the docking facility. On departure, the watercraft moves along the guide rails and as it picks up speed, generates sufficient lift to become self supporting. Similarly, the vessel, on docking, engages the rails and thereafter slows down. As the lift decreases due to the slower speed, the rails support more and more of the weight of the watercraft until the full weight is supported by the rails.

The present invention may be understood with more specificity and clarity with reference to the following figures, in which:

FIGS. 1, 1a, 1b and 1c illustrate a watercraft incorporating the teachings of the present invention.

FIG. 3 illustrates a modification of the central lifting surface.

FIG. 6 illustrates a docking system for the present invention.

FIG. 7 illustrates the relationship between the docking system of FIG. 6 and the water surface.

FIG. 8 illustrates the means for supporting the watercraft on the docking system.

Figure 1B:
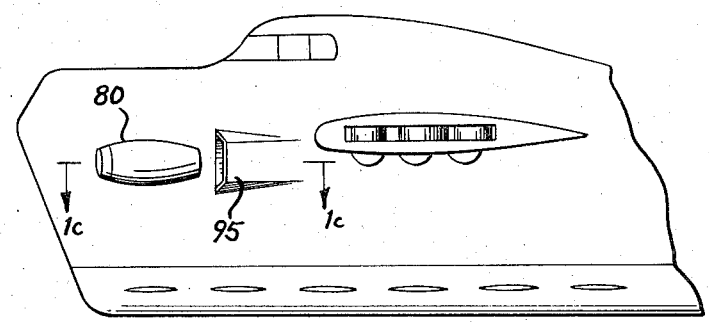
Figure 1C:
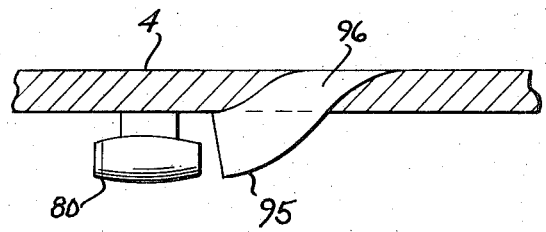

Referring to FIG. 1, there is shown an overall view of the watercraft 1 as taught by the present invention. The hull 2 of the watercraft 1 has a dual function. It serves as the hold for the cargo, and it serves as a lift generating surface, as will be explained in more detail. A pair of sides 3 and 4 extend upwardly and downwardly from the respective longitudinal sides of hull 2.

A bridge 12 interconnects the upper frontal portions of sides 3 and 4. The bridge 12 serves as the control center for operating the watercraft 1. In addition, it contains quarters for the crew. Windows 28 extend along the frontal portion of bridge 12 and along the outer sides of sides 3 and 4. An antenna 13, including a radome (a housing for a radar unit), extends upwardly from bridge 12. The antenna 13 serves as part of the communication link with other vessels and land based installations.

A pair of wings or airfoils 5 and 8 extend outwardly from sides 4 and 3, respectively, in proximity to the bow and in approximate alignment with body 2. These wings serve two primary functions. The first function is that of generating a lifting force for the watercraft 1. The second function is that of providing a means for docking the watercraft 1. Similar airfoils, 6 and 7, extend in proximity to the stern of sides 4 and 3, respectively. These airfoils, 6 and 7, also generate lift and provide a means for docking the craft as well as providing a third function. The third function is that of acting as a base for mounting vertical stabilizers 9 and 10.

These vertical stabilizers 9 and 10 interact with the air stream to provide stability in the lateral axis while the watercraft 1 is underway. A horizontal stabilizer 11 is disposed between vertical stabilizers 9 and 10. The angle of attack of the horizontal stabilizer 11 is controllable and provides stability in the pitch axis while watercraft 1 is underway.

The lower portions, keels 35 and 36, of sides 4 and 3, respectively, extend beneath the surface of the water to water lines 26 and 27, respectively. These keels 35 and 36 interact with the water and provide lateral stability for the watercraft 1.

Propulsion for watercraft 1 is obtained from any one of several different types of propulsion units. The type shown in FIG. 1 includes a high speed screw 24 disposed at the stern of each of the sides 3 and 4. A cavitation plate 37 is disposed above screw 24 to prevent cavitation and loss of power during high speed operation. One of a pair of rudders 25 also disposed at the stern of each of the sides 3 and 4 to provide control in the lateral axis. It is to be understood, however, that propulsion units such as jet engines or turbine driven air screws can be readily incorporated into the present invention.

In addition, it is feasible to mount a plurality of jet engines 80, 81 and 82 along the outside of sides 3 and 4, which engines serve two functions, as shown in FIG. 1a. First, they serve as a basic means for propelling the watercraft 1. Second, by mounting the engines on a pivot, the direction of thrust can be varied from a horizontal to a vertical thrust line. In this manner, the thrust can be used to augment the other lift generating elements at low speed and aid in low speed maneuverability.

The inboard and outboard surfaces of each of the sides 35 and 36 include a plurality of hydrofoils 15, 16 and 17, 18, respectively, disposed along the length of the sides and extend outwardly therefrom. These hydrofoils 15, 16, 17 and 18 are rotatable through a predetermined angular freedom, whereby the angle of attack of the hydrofoils with respect to the water through which the watercraft 1 travels can be varied.

The angle of attack at which the hydrofoils 15, 16, 17 and 18 are set, in combination with the speed of the watercraft 1, determines the amount of lift generated by the hydrofoils. If the angle of attack of an hydrofoil is positive, the force generated will be positive and establish an upward force in proximity to the hydrofoil. Conversely, if the angle of attack is negative, the force generated will be negative and establish a downward force in proximity to the hydrofoil. With this arrangement, it is possible to rotate each of the hydrofoils a uniform number of degrees to establish the same positive angle of attach for each hydrofoil. Each hydrofoil will then generate an upward force with the resultant force tending to lift the watercraft 1 as a whole without affecting the angle between the longitudinal axis of the watercraft 1 and the water surface. Alternatively, only the forward hydrofoils can be rotated to a positive angle of attack resulting in a lifting force acting upon the forward part of the watercraft 1. Such a forward lifting force will tend to raise the bow without affecting the vertical position of the stern nor modify the angle between the longitudinal axis of the watercraft 1 and the water surface.

The arrangement as shown of placing a plurality of hydrofoils along the longitudinal axis of the watercraft 1 has several advantages. First, the forces generated by the hydrofoils are more evenly distributed along the full length of the hull 2, as compared with the use of strut supported hydrofoils positioned at the four corners of a vessel. Second, the distribution of forces simplifies and reduces the structural rigidity between the bow and the stern of the watercraft. Third, the controlability of the angle of attack of each of the hydrofoils permits a precise determination of the amount and distribution of the generated lift forces.

Figure 2:
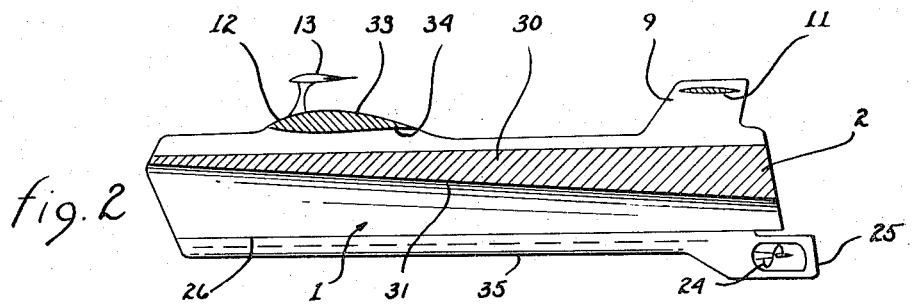
FIGS. 2, 2a and 2b illustrate cross sections of the lifting surfaces shown in FIG. 1.

FIG. 2 illustrates a cross section of several lift generating surfaces of the present invention. The cross section of bridge 12 is shaped as a semi-symmetrical airfoil. That is, the top surface 33 is convex shaped, having its high point at approximately forty percent of the chord. The lower surface 34 is also convex shaped, having its high point approximately similarly positioned to the high point of surface 33. However, the curvature of the upper surface 33 is greater than the curvature of the lower surface 34. As is well known to those skilled in the aerodynamic art, such a cross section, when placed in an air stream, will produce a lifting force. In this manner, the bridge 12 functions as a lifting surface for watercraft 1.

The horizontal stabilizer 11 disposed between and connected to rudders 9 and 10 is symmetrical; that is, the curvature of the upper surface is equal to the curvature of the lower surface. Therefore, the lift produced by stabilizer 11, when at a zero degree angle of attack, will be zero. However, if the angle of attack is varied positively or negatively, a corresponding force will be generated perpendicular to the air stream. In this manner, a force is generated to permit positioning of the watercraft 1 in the pitch axis.

The hull 2 of the watercraft 1 is also a lift generating surface. The deck 30 is generally parallel to the water line. The lower surface 31 of hull 2 is at a positive angle of attack with respect to the forward movement of watercraft 1. The effect of lower surface 31, when the watercraft 1 moves forward, is that of striking the air stream at an angle and deflecting the air stream to produce a lifting force. The total lifting force is a function of both speed and angle of attack. Thus, it is possible to obtain a wide speed range by simply varying the angle of attack to obtain the requisite lifting force.

The amount of lifting force and drag produced by a planar surface set at an angle of eight degrees with respect to the air stream may be shown by the following calculations:

The lift and drag characteristics of a flat plate, the equivalent of lower surface 31 of watercraft 1, may be computed by the following formulae: The drag, or force (F), exerted on a free standing flat plate perpendicular to an airstream is obtained by:

$$F = 1.28 \, \rho/2 \, a \, V^2$$

where 1.28 = a constant representing the turbulence about the free edges of the flat plate. It will be disregarded in this analysis because the edges of lower surface 31 are not free.

$\rho$ = density of air at sea level (0.002378 slugs, or 0.002378 lbs sec$^2$)/ft 4

$a$ = area of a flat plate (ft$^2$)

V = velocity (ft/sec)

Where the flat plate is at an angle ($\theta$) other than perpendicular to the airstream, the force (F') acting upon the flat plate may be separated into a lift and a drag component by the following formulae after first multiplying the force (F) by the sine of the angle (sin $\theta$), or F' = sin $\theta$ F Lift (L) = F' cos $\theta$, or F sin $\theta$ cos $\theta$
Drag (D) = F' sin $\theta$, or F sin$^2$ $\theta$
Where $\theta$ = 8°,
L = ½ $\rho$ V$^2$ $a$ cos 8° sin 8°
and D = ½ $\rho$ V$^2$ $a$ sin$^2$ 8°

If one assumes the speed of the watercraft to be 120 mph, or $$V = 176 \text{ ft/sec,}$$

then L = (0.5) (2.378 × 10$^{-3}$) (1.76 × 10$^2$)$^2$ (0.988) (0.139) $a$ = 5.05 $a$ lbs.
and D = (0.5) (2.378 × 10$^{-3}$) (1.76 × 10$^2$)$^2$ (0.139) (0.139) $a$ = 0.710 $a$ lbs The power required to overcome the drag (D) is Power = (Drag) ($a$) (Velocity)/550 = (0.710) (176) $a$ /550 = 0.227 $a$ H.P.

Where the watercraft has a lower surface area of 60 × 400 ft$^2$, the power required is:

Power = (0.227) (2.4 × 10$^4$) H.P. = 5,450 H.P.

and it will generate a lift equal to:

Lift = (5.05) (2.4 × 10$^4$) lbs = 12.1 × 10$^4$ lbs or = (12.1 × 10$^4$) tons/(2 × 10$^3$) = 60.5 tons A lifting surface which is wedge shaped in cross section, as shown in FIG. 2, will have a tendency to orient itself with respect to the air stream whereby the upper and lower surfaces (deck 30 and lower surface 31) are each at opposite but equivalent angles of attack with respect to the air stream. Should this be permitted to occur, the total lift produced by the wedge shaped lifting surface will necessarily diminish to zero.

There are several methods by which the angle of attack of the lower surface 31 may be maintained. One such method is to provide an additional balancing lifting surface. The configuration of bridge 12 serves this function in that the lift generated by bridge 12 is substantially in front of the center of lift of hull 2. Another method for controlling the angle of attack of the lower surface 31 is that of rotating horizontal stabilizer 11 to provide an equal and opposite force moment to maintain lower surface 31 at the desired angle of attack.

Yet another method for controlling and maintaining the angle of attack of lower surface 31 is rotatable hydrofoils 15, 16, 17 and 18. These hydrofoils interact with the water through which the watercraft 1 is traveling. By rotating each of the hydrofoils to an appropriate angle, control of the watercraft 1 in the pitch axis is obtained. Because water is very dense with respect to air, the amount of angular orientation of the hydrofoils need be relatively small while still obtaining the requisite force to maintain watercraft 1, and therefore lower surface 31, at the desired angle of attack. By integrating the movement of the movable surfaces (horizontal stabilizer 11 and hydrofoils 15, 17, 17 and 18), precise control of the angle of attack of lower surface 31 for various air speeds may be achieved.

For maximum efficiency in traveling through the combined mediums of air and water, the watercraft 1 should have as few surfaces not parallel to the air stream or water flow as possible. This desired condition departs from an optimum condition in proportion to the magnitude of the negative forces necessary to maintain lower surface 31 at the preferred angle of attack. In order to rely to a minimum extent upon the horizontal stabilizer 11 and the hydrofoils 15, 16, 17 and 18 for positional control in the pitch axis, the configuration of the lower surface 31 may be altered.

Referring to FIG. 3, there is shown a watercraft 1 having an altered lower surface of hull 2 shown as surfaces 40 and 41. The angle of attack of lower surface 40, with respect to the air stream, is approximately three degrees. The length of the lower surface 40 is approximately one-third the total length of the lower surface of hull 2. The angle of attack of lower surface 41 with respect to the air stream is approximately eight degrees. The length of the lower surface 41 is approximately two-thirds the total length of hull 2.

The total effect of lower surfaces 40 and 41 upon the pitch stability of watercraft 1 may be explained as follows. As the watercraft 1 travels at operating speed, the lower surface 41 will generate a predetermined amount of lift. Similarly, the lower surface 40 will generate a predetermined amount of lift. Assuming for the moment that horizontal stabilizer 11 and hydrofoils 15, 16, 17 and 18 (seen FIG. 1) are set at a neutral angle, the stern of the watercraft 1 will tend to rise because the friction due to water acting upon the keels 35 and 36 is greater than the air resistance presented by the watercraft 1. As a result, the watercraft 1 will tend to rotate counterclockwise about its center of gravity. As the stern begins to rise, the effective angle of attack of lower surface 40 decreases from three degrees to a lesser value. The decreased angle of attack of lower surface 40 results in a smaller lift component attributable thereto. At some value of angle of attack of lower surface 40, the lift produced thereby is equal to the difference between the weight at the stern and the rotational force tending to rotate the watercraft 1 in a counterclockwise direction. At that position, the watercraft 1 become stable in the pitch axis without additional air from control surfaces, such as horizontal stabilizer 11 and hydrofoils 15, 16, 17 and 18 (see FIG. 1). Rotation of watercraft 1 in the counterclockwise direction will necessarily reduce the angle of attack of lower surface 41 as well. However, the angle of attack of lower surface 41 is substantially greater than the angle of attack of lower surface 40 and therefore lower surface 41 will continue to provide lift for watercraft 1 even though the lift provided by lower surface 40 is zero or minimal.

Figure 4:
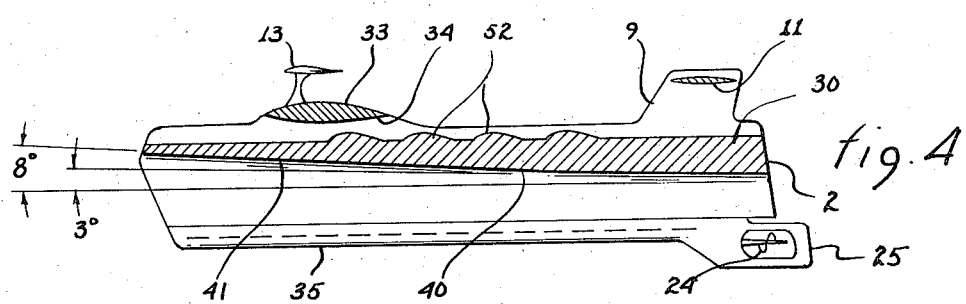
FIG. 4 illustrates a further modification of the central lifting surface.

Referring to FIG. 4, there is shown yet another modification of the hull 2 of the present invention. A hull 2, shown in cross section, illustrates the two distinctly angled lower surfaces 40 and 41, as described above. In addition, the upper surface 20 of body 2 includes a plurality of convex sections 52 transverse the longitudinal axis of watercraft 1. These sections 52 are similar in curvature to the upper surface of an airfoil. The purpose of these sections is to generate an additional lift component in the same manner as the upper surface of an airfoil generates lift. The number and chord of sections 52 and their position along deck 30 is dependent upon the required magnitude of the additional lift component and the positional relationship of the resultant lift generated by the sections 52 with respect to the other lift surfaces present.

Figure 5:
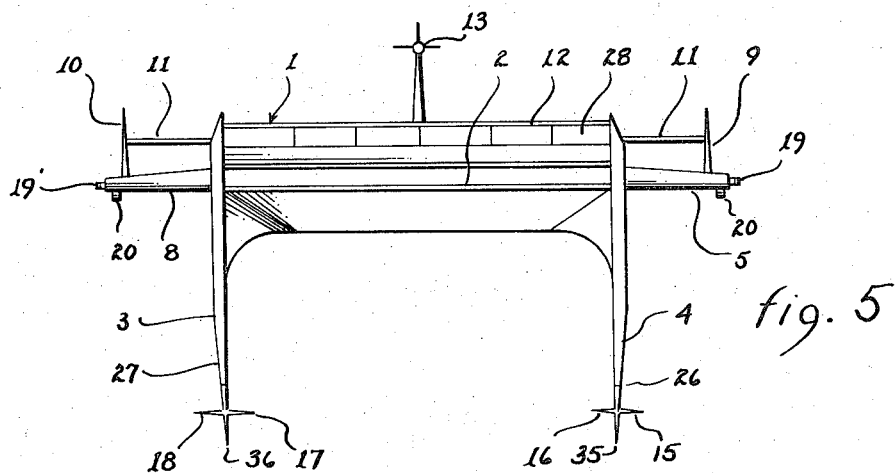
FIG. 5 illustrates a frontal view of the present invention as shown in FIGS. 1 and 2.

FIG. 5 is a frontal view of the watercraft as shown in FIG. 2. In order to avoid the problems mentioned above with respect to the rotation of the wedge shaped hull 2, the distribution of the area of lower surface 31 is modified. Instead of lower surface 31 being essentially rectangular, the trailing edge 50 is narrower than the leading edge 51, thereby producing a generally trapezoid shaped lower surface 31. To compensate for the narrower trailing edge 50 without modifying the sides 3 and 4, a fillet 53 and 54 is formed between the generally longitudinal sides of lower surface 31 and the respective sides 4 and 3. In this manner, the resultant lift force generated by lower surface 31 is not positioned at the geometrical center of lower surface 31 but is moved forward therefrom. Thus, the resultant lift acts through a point forward of the center of gravity of watercraft 1 and inhibits the tendency of the watercraft to rotate in a counterclockwise direction. The fillets 53 and 54 serve also to streamline the junction of lower surface 31 and sides 3 and 4 to reduce induced drag.

Figure 5A:
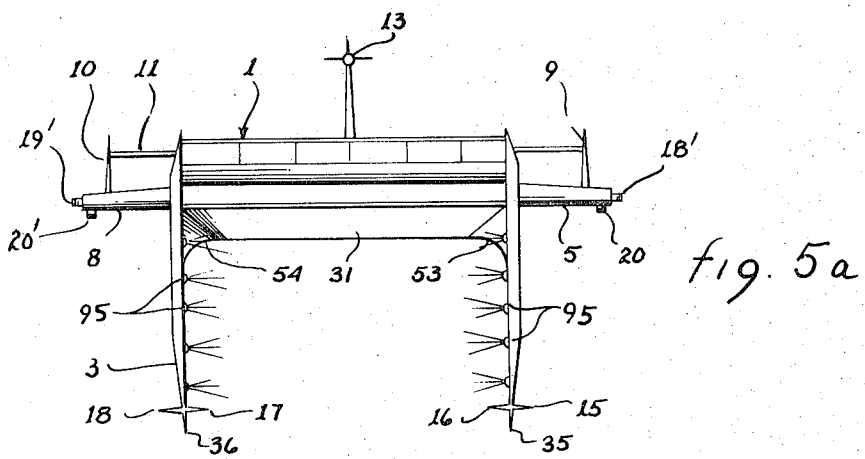
FIG. 5A illustrates a frontal view of the present invention showing a plurality of water nozzles.

The reduced cross sectional area at the stern with respect to the cross sectional area at the bow brings about a tendency to create an air cushion beneath the lower surface 31. As is well known in the art, such an air cushion will contribute to the total lift generated by watercraft 1. Additional lift is also available by increasing the density of the air beneath the lower surface 31. An increase in density can be effected by injecting a mist of water vapor from the nozzles 95 disposed along the inner sides of sides 3 and 4, as shown in FIG. 5a. In operation, the injected water mist will mix with the air forced between the sides 3 and 4 and the lower surface 31 as the watercraft travels forward. The mixture of water mist and air will be more dense than air alone and thereby cause an increase in the total lift of lower surface 31.

The variable lifting force from the bow to the stern accomplished by modifying the lower surface 31, as shown in FIGS. 4 and 5, or by maintaining the lower surface 31 at the desired angle may also be accomplished by the structure of the hydrofoils 15, 16, 17 and 18. In the previously described mode of setting each of the hydrofoils 15, 16, 17 and 18 at the same angle of attack, each of the hydrofoils will generate approximately the same amount of lift. However, if the size of the individual hydrofoils is reduced from the bow to the stern, the rearward hydrofoils will generate less lift than those at the bow even though all of the hydrofoils are at the same angle of attack. The resulant lifting force will be forward of midship and tend to inhibit the tendency of the watercraft to rotate counterclockwise. The physical size of the hydrofoils may be fixed as described above or it may be variable for each hydrofoil. The variable hydrofoil size can be accomplished by selectively retracting a part of each of the hydrofoils into the respective side. Thus, the amount of surface exposed to the water flow is selectively reduced and provides a means for controlling the amount of generated lift.

FIG. 5 also illustrates the hydrofoils 15, 16, 17 and 18 extending from either side of sides 4 and 3, respectively. These hydrofoils are positioned below the waterline 26 and 27 of sides 4 and 3 to provide lift and control the pitch angle of watercraft 1.

Figure 2B:
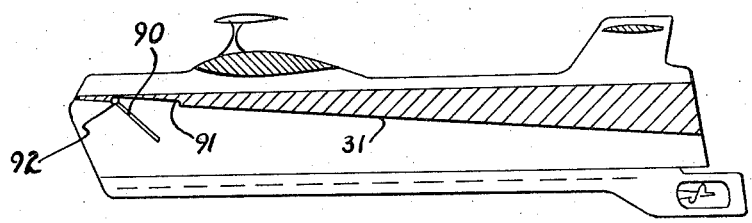
Figure 2A:
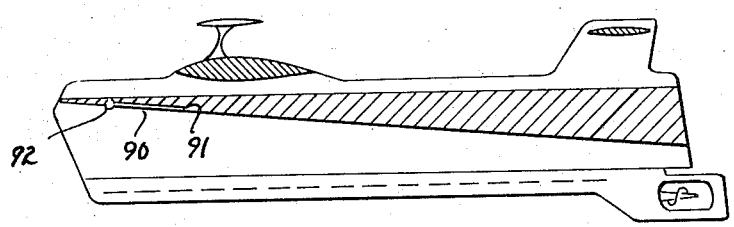

During slow speed operation, such as docking or "lingering" about a specified location, the effective lift produced by the hydrofoils 15, 16, 17 and 18 in combination with hull 2 may be less than that required to prevent the watercraft from settling, depending upon the amount of cargo. For slow speed capability, the present invention operates on the principle common to all surface effect vessels. The structure necessary to obtain the surface effect capability is shown more clearly in FIGS. 2a and 2b.

A flap 90 is hingedly secured to the forward part of surface 31 by a hinge 92. A recess 91 disposed within surface 31 receives flap 90 such that, in the closed position, the planar surface of surface 31 is uninterrupted by flap 90. Mechanical means, be they electric, hydraulic or some other means, are actuated to raise and lower flap 90.

In operation, as the watercraft 1 slows down, the effective lift generated by the previously mentioned lift generating members is reduced. With the reduction in lift generating capability, the watercraft 1 will tend to settle into the water. Concurrent with the reduction in forward speed, flap 90 is rotated downwardly until the extremity of flap 90 and the rear edge of surface 31 lie in the same horizontal plane. The flap 90 includes sealing members, such as elastic flaps or inflatable bags, disposed at the sides thereof whereby a seal is formed between the inside of sides 3 and 4 and the edges of flap 90. Thus, flap 90 in combination with surface 31 and the insides of sides 3 and 4 effectively forms a pocket of air.

Air pressure generating elements (not shown), such as fans, turbines, or other similar devices are disposed within hull 2 to supply the pocket with an air input. As the watercraft 1 settles in the water, the rear edge of surface 31 and the extremity of flap 90 will ultimately contact the surface of the water. At this point, the pocket will effectively be sealed. The pressure generating elements will increase the air pressure within the pocket and raise the watercraft 1. When the watercraft 1 is sufficiently raised above the surface of the water, the inflowing air will escape from the pocket adjacent the rear of surface 31 or the extremity of flap 90.

The degree of settling of the hull 2 within the water will be to the extent of the plane approximately defined by the extremity of flap 90 and the rear edge of surface 31. Should the watercraft 1 attempt to settle any lower in the water, the air pressure within the pocket will build up and tend to raise the hull. The height to which the hull will be raised is approximately equivalent to that height which permits an overflow of air from the pocket adjacent the extremity of flap 90 or the rear of surface 31 while maintaining sufficient air pressure within the pocket to support watercraft 1 in conjunction with the remaining operative lift generating members.

As the watercraft 1 begins to settle in the water, there will be an incremental time period until the air pressure formed within the sealed pocket is of sufficient magnitude to support the watercraft 1. Therefore, the watercraft will tend to momentarily sink lower than desired. A rapid pressure buildup can be expeditiously effected by incorporating a standby compressed air source within hull 2. The compressed air is automatically released into the pocket when the extremity of flap 90 and the rear of surface 31 jointly come in contact with the water surface. By this arrangement, an almost instantaneous pressure envelope is developed within the pocket to support the watercraft 1. The repidly developed pressure envelope prevents watercraft 1 from momentarily settling until the air pressure developed by the air pressure generating elements becomes sufficient to support the watercraft 1.

During the transition of the watercraft 1 from slow speed operation to normal speed operation, the lift generating elements will generate an increasing lift proportional to the increasing speed. The increasing lift will raise watercraft 1 until the lift provided by the above described pocket of pressurized air is no longer effective in supporting watercraft 1. At this point, flap 90, serving no further useful purpose, is rotatably raised into recess 91. In the raised position, flap 90 forms a part of surface 31 and, in conjunction therewith, generates lift as described above with respect to surface 31. Concurrent with the raising of flap 90, the compressors providing compressed air within the above-described pocket are shut off.

As an alternative to air compressors disposed within hull 2, the exhaust from jet engines 80, 81 and 82 may be used to provide pressurized air from the above-described pocket. Scoops, such as retractable scoops 95 positioned immediately rearwardly of the jet engines, are used to deflect a portion of the jet engine exhaust within the pocket. Under normal cruising operation, the scoops 95 are retracted within sides 3 and 4 to decrease the air resistance as there is no need for deflecting a portion of the exhaust between sides 3 and 4. During slow speed operation, however, the scoops 95 are extended into the exhaust stream of jet engines 80, 81 and 82 to deflect a portion of the exhaust into the pocket. The deflected exhaust flow through apertures 96, the latter being disposed in each of sides 3 and 4. The deflected exhaust, being at a greater pressure than that of the ambient air, will supply the pressure envelope within the pocket.

Although not shown in the diagrams, it is feasible for each of the jet engines 80, 81 and 82 to be pivotally mounted. Such a mounting permits variation of the thrust line of the jet engines. The thrust may then be used not only in the horizontal plane to generate the requisite power for forward motion, but may be used as a lifting force by rotating the thrust line downwardly. The thrust, being directed downwardly, will have a horizontal component and a vertical component. The magnitude of each of these components is of course controlled by the angle of rotation. Therefore, for slow speed operation, the jet engines 80, 81 and 82 are rotated to such an angle as to produce a vertical component of thrust of a magnitude sufficient to compensate for the loss of lift generating capability due to the slower forward velocity.

In order to reduce the parasitic air drag at the stern of the watercraft, a system of vents (not shown) may be used. The use of such vents reduces the low pressure area created immediately astern any vessel. By reducing the low pressure area, the parasitic drag is diminished.

As may be deduced from studying FIGS. 1 – 5, the sides 3 and 4 being positioned beneath the surface of the water have two primary stabilizing effects on watercraft 1. First, the sides 3 and 4 are disposed at the outermost edges of hull 2. As such, they act as outriggers to prevent rotation about the longitudinal axis. The effect of keels 35, 36 stabilizes the watercraft 1 in the lateral axis. Sides 3 and 4, extending along the full length of watercraft 1, provide a stabilizing force in the pitch axis by reducing the effect of rolling seas. A yet further benefit of the sides 3 and 4 is that of providing a lift force, due to displacement lift, uniformly extending for the full length of the watercraft 1.

One of the major disadvantages of hydrofoil vessels is that of size limitation. It is well known that the struts extending downwardly at the approximate four corners of the vessel may be separated from one another by no more than a given distance without causing undue strain on the structure of the vessel between the fore and aft struts. A criteria generally used by the United States Navy is that of limiting hydrofoil vessels to 1,000 tons or smaller. In situations where a semi-airborne vessel is to be used as a cargo carrier in view of the well-known high speed possibilities, the limitation in size for hydrofoil vessels, due to the concentrated lift forces, practically precludes their use.

In the present invention, the sides 3 and 4, extending for the complete length of the watercraft 1, may easily be configured by those skilled in the art to provide the requisite rigidity between the bow and the stern regardless of the size of the watercraft 1. In addition, the lifting forces generated by hydrofoils 15, 16, 17 and 18 are distributed along the length of the hull 2. Thus, the present invention avoids the structural limitations placed upon hydrofoil vessels and yet achieves the benefits of the small wetted area of hydrofoil vessels.

In the figures, the means for propulsion is shown as high speed screws. Recent developments of high speed screws have made feasible the use of such screws for high speed operations of large vessels. However, there may be reasons dictating against the use of screws, and a change in propulsion system from a screw to a water stream, jet engines, or some other high speed propulsion unit is deemed to be a feasible method for powering the present invention.

The horizontally and vertically oriented wheels, 19, 19' and 20, 20' are shown in FIG. 5 as the furthermost side extensions of watercraft 1. As will be described below, these wheels guide and provide support for watercraft 1 during docking maneuvers. FIG. 6 illustrates a docking system suitable for use with the watercraft 1 of the present invention. A pair of receiving rails 60 and 61 are supported by pilings 64 and extend into the water 50. At the receiving end 56, the rails 60 and 61 are separated from one another to a width greater than the width between wheels 19 and 19' (See FIG. 5). The wider receiving end 56 permits the watercraft 1 to be piloted toward the pair of rails 60 and 61 without requiring exact alignment therebetween. Should the watercraft 1 be slightly misaligned, wheels 19 or 19' will contact the respective vertical side 47 (See FIG. 8) of the rail and realign the watercraft 1 to the centerline between the rails 60 and 61. After contacting both rails 60 and 61, the watercraft 1 will begin to slow down. As the watercraft 1 slows down, the lifting forces generated by the various members of the hull 2 will be reduced. The reduction in lift forces will tend to cause watercraft 1 to settle in the water. As the watercraft 1 settles, wheels 20 and 21 engage the horizontal member 45 of both rails 60 and 61 and thereby provide support for watercraft 1.

While being supported by rails 60 and 61, watercraft 1 may propel itself or be pulled by appropriate means to a docking area shown generally as 73. A movable crane 66 with control tower 67 and appropriate cargo lifting mechanisms will load and unload watercraft 1.

When departing from docking facility 73, the watercraft is accelerated until the various lifting surfaces generate sufficient lift to support the watercraft. Coincident with the generation of supporting lift, the rails 62 and 63 widen in a similar manner as the receiving end 56 to permit the watercraft 1 to depart from the docking facility 73.

FIG. 7 illustrates a docking facility for use in tidal waters to provide compensation for the varying water level 70. A pair of receiving rails 71 slope upwardly from the water surface 70. This permits watercraft 1 to engage the receiving rails 70 at varying points depending upon the relative height of the wheels 19, 19', 20, 20'. The height is of course dependent upon the height of the water surface 70. The watercraft will continue upwardly along the pair of rails 71 to the docking area generally shown as 73. On departing from docking area 73, the watercraft will engage the departing rails 72. The departing rails 72 slop downwardly toward the water surface 70 whereby the watercraft is permitted to accelerate and generate lifting forces until it no longer depends upon the rails for support. The watercraft 1 will be disengaged from rails 72 at varying points therealong depending upon the height of the water surface 70.

Safety of operation requires that all vessels be capable of floating should the propulsion system fail. The sides 3 and 4 and hull 2 of the watercraft 1 of the present invention provide sufficient buoyancy to satisfy the safety requirements. Thus, the watercraft 1, although preferably requiring a relatively sophisticated docking system, is not limited thereto for safe operation.

It is generally well known that the amount of power required for sustained high speed operation is, with appropriate hull design, sufficient to effect the transition a displacement vessel to a hydrofoil or air supported vessel. Thus, the power of the propulsion system is sufficient to raise the watercraft 1 from the position at rest within the water to the desired height above the water.

The watercraft 1 of the present invention is also suitable for use by the Navy where vessels must have a lingering capability. The hydrofoils 15, 16, 17 and 18 may be used as the primary lift generating surfaces rather than as lift and control surfaces. Because of the density of the water within which the hydrofoils 15, 16, 17 and 18 operate, the angle of attack can be increased for slow speed operation to generate sufficient lift to support the watercraft 1.

The control system for the watercraft of the present invention is necessarily relatively sophisticated in order to integrate the various control surfaces, and lift producing surfaces to obtain a stable operation of the watercraft 1. Such a control system can be accommodated through the knowledge presently available within the aircraft guidance industry.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A watercraft generating lift through forward motion of said watercraft, said watercraft comprising:
   a. a hull having a deck and a lower surface; said deck and said lower surface being at an angle with respect to one another, the apex of said angle being in proximity to the bow of said watercraft;
   b. a pair of sides, each said side depending from a longitudinal side of said hull and extending below the surface of the water;
   c. a plurality of rotatable hydrofoils disposed along each of said sides and extending outwardly from each of said sides, the size of forward ones of said plurality of hydrofoils being greater in size than rearward ones of said plurality of hydrofoils, said hydrofoils being disposed beneath the surface of the water and rotable to define an angle of attack with respect to the water surface; and
   d. a propulsion unit for propelling said watercraft, whereby, the movement of said watercraft generates a lift force to support said watercraft.

2. A watercraft generating lift through forward motion of said watercraft, said watercraft comprising:
   a. a hull having a deck and a lower surface;
   b. a pair of sides, each said side depending from a longitudinal side of said hull and extending below the surface of the water;
   c. a rotatable flap, said flap being hinged to said lower surface and extending between said sides;
   d. a plurality of rotatable hydrofoils disposed along each of said sides and extending outwardly from each of said sides, said hydrofoils being disposed beneath the surface of the water and rotatable to define an angle of attack with respect to the water surface;
   e. a plurality of jet engines disposed along each of said sides;
   f. means for deflecting a part of the exhaust of said jet engines through said side and adjacent said lower surface; and
   g. a propulsion unit for propelling said watercraft, whereby the movement of said watercraft generates a lift force to support said watercraft.

3. The watercraft as set forth in claim 2 wherein said deflecting means comprises a plurality of apertures, each said aperture extending through one of said sides adjacent one of said jet engines; and a plurality of scoops, each said scoop extending from one of said sides in proximity to the flow of exhaust gases from one of said jet engines, whereby a part of the exhaust gases are deflected through said apertures by said scoops.

* * * * *